(12) United States Patent
Volpe et al.

(10) Patent No.: US 10,803,007 B1
(45) Date of Patent: Oct. 13, 2020

(54) RECONFIGURABLE INSTRUCTION

(71) Applicant: Amazon Technologies, Inc., Seattle, WA (US)

(72) Inventors: Thomas A. Volpe, Austin, TX (US); Nafea Bshara, San Jose, CA (US); Raymond Scott Whiteside, Austin, TX (US); Ron Diamant, Albany, CA (US)

(73) Assignee: Amazon Technologies, Inc., Seattle, WA (US)

( * ) Notice: Subject to any disclaimer, the term of this patent is extended or adjusted under 35 U.S.C. 154(b) by 60 days.

(21) Appl. No.: 16/146,834

(22) Filed: Sep. 28, 2018

(51) Int. Cl.
*G06F 11/36* (2006.01)
*G06F 12/00* (2006.01)
*G06F 15/78* (2006.01)
*G06F 9/30* (2018.01)

(52) U.S. Cl.
CPC ...... *G06F 15/7882* (2013.01); *G06F 9/30101* (2013.01); *G06F 15/786* (2013.01)

(58) Field of Classification Search
None
See application file for complete search history.

(56) References Cited

U.S. PATENT DOCUMENTS

| | | | |
|---|---|---|---|
| 7,379,860 B1 | 5/2008 | Bartz et al. | |
| 7,865,771 B2 | 1/2011 | Yang | |
| 8,095,917 B2 * | 1/2012 | Stall | G06F 11/3664 |
| | | | 717/130 |
| 2008/0010621 A1 | 1/2008 | Williams | |
| 2009/0049312 A1 | 2/2009 | Min | |
| 2010/0332909 A1 | 12/2010 | Larson | |
| 2012/0124047 A1 | 5/2012 | Hubbard | |
| 2013/0346594 A1 | 12/2013 | Banerjee et al. | |
| 2014/0305525 A1 | 10/2014 | Le Moing et al. | |
| 2015/0100767 A1 * | 4/2015 | Topham | G06F 9/30192 |
| | | | 712/226 |
| 2015/0100842 A1 * | 4/2015 | Rao | G01R 31/3177 |
| | | | 714/733 |
| 2016/0142940 A1 | 5/2016 | Teo et al. | |
| 2017/0083434 A1 * | 3/2017 | Potash | G06F 9/00 |

(Continued)

OTHER PUBLICATIONS

U.S. Appl. No. 16/216,873, filed Dec. 11, 2018 Titled "Execution Synchronization and Tracking".

(Continued)

*Primary Examiner* — Hyun Nam
(74) *Attorney, Agent, or Firm* — Kilpatrick Townsend & Stockton LLP

(57) ABSTRACT

Provided are integrated circuit devices and methods for operating integrated circuit devices. In various examples, an integrated circuit device can include a memory for storing instructions a configuration register, and an instruction execution circuit. An instruction read from the memory can be a reconfigurable instruction. which includes a set of fields corresponding to a plurality of operations. Values in the fields can determine whether the operations are enabled or disabled. For example, a first value in a first field can enable a first operation. Whether the first operation is performed can further be determined by comparing a second value in a second field to a third value read from the configuration register. The value set in the configuration register thus can control whether the operation is performed.

24 Claims, 6 Drawing Sheets

(56) References Cited

U.S. PATENT DOCUMENTS

2017/0083464 A1* 3/2017 Potash .................... G06F 13/28
2018/0365017 A1 12/2018 Shirvani et al.

OTHER PUBLICATIONS

U.S. Appl. No. 16/216,855, filed Dec. 11, 2018 Titled "Event-Based Device Performance Monitoring".
U.S. Appl. No. 16/200,602, filed Nov. 26, 2018 Titled "Configurable Reporting for Device Conditions".
U.S. Appl. No. 16/200,620, filed Nov. 26, 2018 Titled "Operational Management of a Device".
"Embedded Trace Buffer", Texas Instruments Wiki, Available online at: https://processors.wiki.ti.com/index.php/Embedded_Trace_Buffer, 2020, 10 pages.
"U.S. Appl. No. 16/145,050 ", Notifications in Integrated Circuits, filed Sep. 27, 2018, 49 pages.

* cited by examiner

RECONFIGURABLE INSTRUCTION

BACKGROUND

A processor is an integrated circuit device that is able to execute program code. The processor can include a small amount of memory for storing program instructions, which can be referred to as an instruction buffer or instruction memory. To execute the instructions, the processor can include circuitry for fetching an instruction from the instruction memory, for decoding the instruction, for reading data that is to be operated on, for performing an operation defined by the instruction, and/or for writing a result of the operation to a storage location, among other circuitry.

An instruction set is a description of the instructions that a processor can execute. The instruction set of a general purpose processor can include, for example, arithmetic instructions, logical instructions, instructions for writing or reading data to registers, instructions for memory operations, and so on. The instruction set of a special-purpose processor can include instructions that are specific to the processor. For example, a graphics processing unit (GPU) may have a single instruction for performing a complex and often-needed computation, which a general purpose processor may need multiple instructions to perform.

Program code is often written in a high-level language, in which complex concepts such as objects and functions can be expressed, and which can be easier for humans to read. For the program code to be made readable by a processor, the program code can be compiled (e.g., translated) into a lower-level language, such as assembly language, from which the program code can be encoded into binary code. The structure of the binary code can be more efficient for the processor to read and understand than a higher and more abstract representation of the program code.

BRIEF DESCRIPTION OF THE DRAWINGS

Various embodiments in accordance with the present disclosure will be described with reference to the drawings, in which.

DETAILED DESCRIPTION

Figure 1:
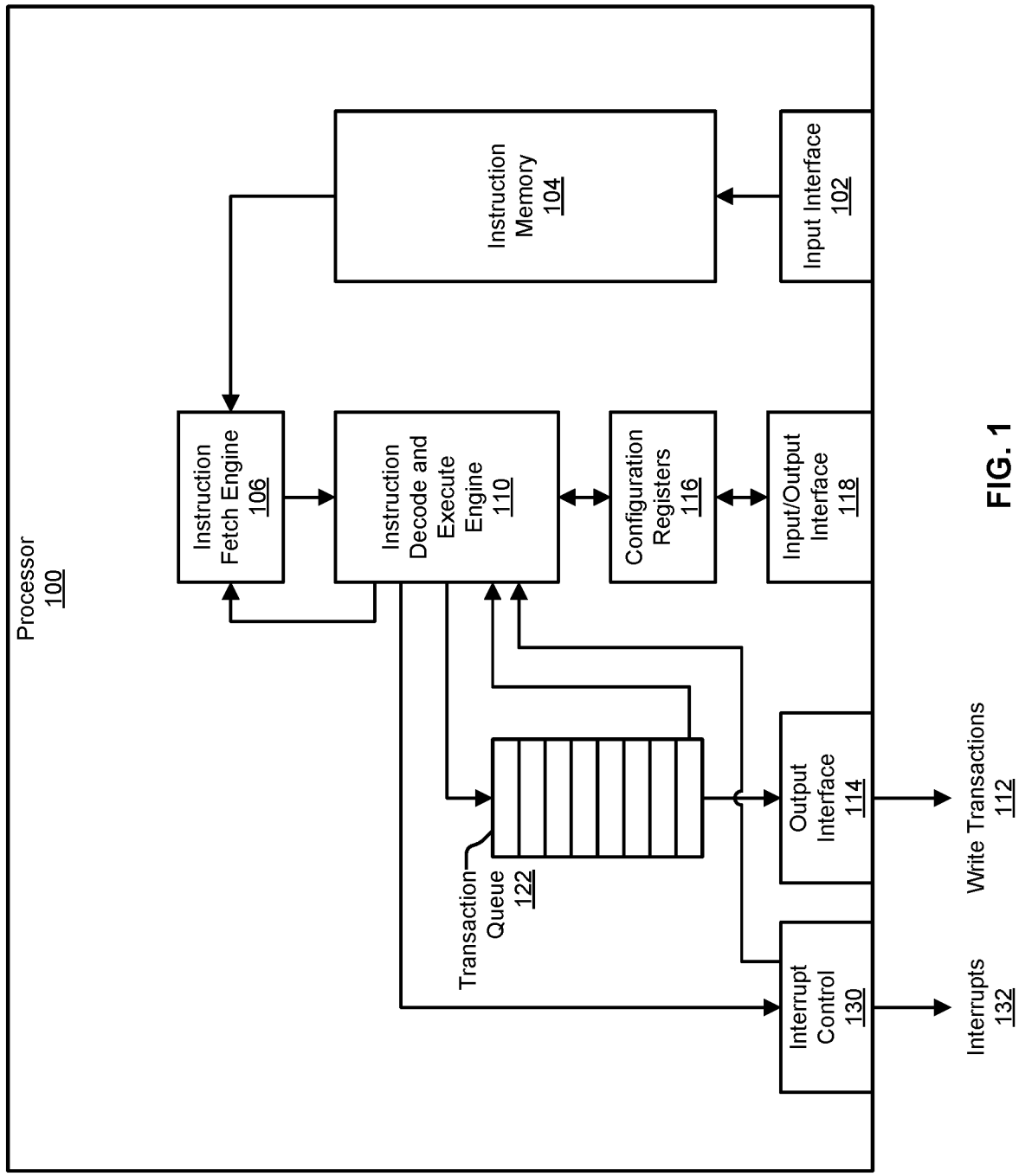
FIG. 1 is a block diagram illustrating an example of a processor that can implement a reconfigurable instruction.

Compiling program code from a more abstract representation to a machine-level representation is generally a time consuming process. A high-level program construct may require many machine instructions, and it may happen that different sets of instructions may be appropriate for different uses of the same construct. Thus, compilation can require a great deal analysis of the overall structure of the code. The instruction memory of a processor is often also limited in size, and having to frequently load instructions into the instruction memory can slow down the operation of the processor. Compilation can thus require reducing the machine instructions to the smallest possible number, and determining an efficient organization of the machine instructions. These operations can be computationally intensive and thus require significant time to complete.

It is thus desirable to avoid recompiling a program. In some cases, however, it may be desirable to change the operation of the program. For example, the program may not be behaving as expected, and thus it may be desirable to insert instructions into the code that provide some insight into the behavior. As another example, it may be desirable to adjust the operation of the program as the program's behavior and the behavior of computing system become clear. Program instructions, however, once compiled, mostly have a fixed behavior when executed by a processor. To change the operation of the program, rewriting and recompiling the program may be necessary, which can also result in changing the behavior of the code.

An alternative to rewriting the program is to include instrumentation code in the program, which can be activated at run time. For example, the code can include print statements that can be activated by command line arguments, and/or conditional behavior that can be changed by command line arguments. In these examples, however, the length of the compiled code is increased and the execution time of the code is changed.

Increasing the length of the program code can be problematic when the processor's instruction memory is not very big. For example, when the processor's instruction memory is only able to store 4000 instructions at a time, any program that is longer than 4000 instructions can require frequent loading of additional instructions into the instruction memory. The loading of instructions into the instruction memory can be a slow operation compared to the execution of the instructions, thus program code that does not entirely fit into the instruction memory can be less efficient to execute.

The addition of instrumentation code can increase the amount of time required to executed the whole program. A simple print statement, for example, is a multi-cycle operation, possibly requiring memory writes and communication with I/O devices. Conditional instructions, such as if-then-else instructions, along with the instructions executed within an if block, can further add many more cycles to the execution of the program.

In various implementations, provided are systems, integrated circuit devices, and methods for operating an integrated circuit device that implements an instruction with reconfigurable behavior. In various examples, the reconfigurable instruction is a single instruction that can cause a processor to perform one or multiple operations (or possibly no operations), which would otherwise be encoded into different instructions. Additionally, the operations that the reconfigurable instruction triggers can be changed at run time by writing a configuration register in the processor. The reconfigurable instruction thus provides the ability to change the behavior of the program without needing to rewrite or recompile the program. Additionally, by being able to execute multiple operations from the one instruction, the reconfigurable instruction enables program code with fewer instructions. Having more compact code can be important when a processor's instruction memory has a limited size. Additionally, the reconfigurable instruction can, depending on the configuration of the processor, can have a consistent execution time (e.g., the instruction uses up the same number of clock cycles) on each execution, regardless of whether the instruction activates certain operations. Thus, the overall execution time of the instruction can, depending on the configuration of the processor, be consistent, even when debugging operations are activated.

In various examples, the operations that the reconfigurable instruction can trigger include producing output that can be used to determine the behavior of the program code and/or of the processor that is executing the program code. For example, the reconfigurable instruction can make the processor output a notification (e.g., a message) or output an interrupt. Other operations that the reconfigurable instruction can trigger can change the behavior of the processor. For example, the reconfigurable instruction may make the processor wait for a set of operations to complete (e.g., synchronize execution to the completion of the operations), halt or stall further execution of instructions, and/or perform a software reset, among other examples. Herein the reconfigurable instruction may also be referred to as NOTIFY_HALT.

In the following description, various examples will be described. For purposes of explanation, specific configurations and details are set forth in order to provide a thorough understanding of these examples. However, it will also be apparent to one skilled in the art that the examples may be practiced without the specific details. Furthermore, well-known features may be omitted or simplified in order not to obscure the examples being described.

FIG. 1 is a block diagram illustrating an example of an processor 100 that can implement a reconfigurable instruction. The processor 100 is an example of an integrated circuit device that can execute program instructions. The processor 100 can be, for example, a floating point processor, a graphics processor, a neural network processor, a special-purpose processor, or any other type of integrated circuit device that can execute program code. For example, the processor 100 can be a special-purpose processor that executes program code for orchestrating the movement of data within a computing system. In various examples, the processor 100 can be implemented using an integrated circuit device, such as an Application Specific Integrated Circuit (ASIC), a Field Programmable Gate Array (FPGA) or a similar integrated circuit device. In some examples, the processor 100 can be incorporated into a larger integrated circuit device. For example, the processor 100 can be a component in a System on a Chip (SoC).

In various examples, the processor 100 can be included in a computing system. The computing system can further include a general purpose processor (which can be referred to as the primary processor or the host processor), other accelerators, various peripheral devices, and a communication fabric over which the components of the computing system can communicate. The general purpose processor can be responsible for overall management of the computing system's operations, including the operation of the processor 100. For example, the general purpose processor can execute a device driver or driver program that controls the processor 100. The computing system can further include various memories, such as processor memory for use by the processor and additional memories for use by the accelerators. In various examples, program code executed by the processor 100 can coordinate the movement of data between the various memories and the accelerators, as well as other components of the computing system.

In the example illustrated in FIG. 1, the processor 100 includes an input interface 102, an instruction memory 104, an instruction fetch engine 106, an instruction decode and execute engine 110, a transaction queue 122, an output interface 114, and an interrupt control 130. The processor 100 further includes configuration registers 116 and a combined input/output interface 118 that can provide an alternative interface for exchanging data with other components in the computing system. In various examples, each of the blocks illustrated in the example of FIG. 1 can include a portion of the overall integrated circuitry of the processor 100.

In various examples, the input interface 102 provides the processor 100 with the ability to receive data from other components in the computing system. The data can include program code and other data. For example, a driver program that controls the operation of the processor 100 can cause program code to be written to the processor 100, which is received at the input interface 102. The input interface 102 can be implemented, for example, as an Advanced Extensible Interface (AXI) slave interface, for when the computing system's communication fabric includes an AXI bus structure. In various examples, other bus structures and bus protocols can be used.

In various examples, the instruction memory 104 can provide the processor 100 with local storage for program code. The instruction memory 104 can be managed by the instruction fetch engine 106, which can keep track of free space in the instruction memory 104, space that is storing not-yet-executed instructions, and space that is storing instructions that the processor 100 has already executed. The instruction fetch engine 106 can further keep track of the next instruction that is to be executed, and can fetch this instruction when the instruction decode and execute engine 110 is ready for another instructions, or possibly in advance of the instruction decode and execute engine 110 being ready. For example, the instruction fetch engine 106 can maintain one or more pointers (e.g., registers storing a location) to the instruction memory 104, for keeping track of the next instruction to fetch and/or the last instruction executed, among other examples.

As an example, the instruction memory 104 can be 64 kilobytes (KB) in size, and be logically organized with 32-bit words (e.g., each addressable location stores 32 bits). In some examples, the instruction memory 104 can be protected using Single-Error Correcting and Double-Error Detecting (SECDED) Error Correcting Code (ECC). In some examples, read and write transfers have lengths in multiples of four bytes, and are 4-byte aligned, or else transactions do not complete and the processor 100 responds at the input interface 102 with an error.

In various examples, the instruction decode and execute engine 110 decodes instructions read from the instruction memory 104 and executes the instructions. The instructions can, for example, cause the instruction decode and execute engine 110 to initiate the movement of data from one location in the computing system to another (e.g., from a memory to another device in the system), wait on a timer, wait on an event, write a notification to a memory location, or trigger an interrupt, among other operations.

As a result of executing instructions, the instruction decode and execute engine 110 can, for example, add write transactions 112 to a transaction queue 122. The transaction queue 122 can store write transactions 112 that are to be output through the output interface 114 to other components in the system. In various examples, the instruction decode and execute engine 110 can also queue read transactions, which are not illustrated here. In some examples, when the transaction queue 122 is full and the instruction decode and execute engine 110 has another transaction to add, the instruction decode and execute engine 110 can stall (e.g., halt further operations) until there is space in the transaction queue 122 for the additional transaction. In various examples, the transaction queue 122 can signal information about itself to the instruction decode and execute engine 110. For example, the transaction queue 122 can indicate whether the transaction queue 122 is full and/or empty. As another example, the transaction queue 122 can identify the most recent transaction sent out through the output interface 114 (for example, by the address and/or type of the transaction, and/or a transaction identifier, among other examples). As another example, the transaction queue 122 can identify the most recent transaction sent and acknowledged by the transaction's destination.

As another example, the instruction decode and execute engine 110 can also initiate the transmission of interrupts 132. In various examples, instructions being executed by the instruction decode and execute engine 110 can initiate interrupts 132. Alternatively or additionally, interrupts 132 can occur due to the instruction decode and execute engine 110 detecting certain conditions in the processor 100, such as errors in the operation of the hardware or in the execution of the program code. In various examples, the interrupt control 130 issues the interrupts 132, which can be received, for example, by the host processor in the system. The interrupt control 130 can further include registers or memories that keep track of the interrupts 132 that have been sent. In some examples, the interrupt control 130 can indicate that an interrupt is "active" or "pending" until the host processor acknowledges the interrupt or transmits a transaction to the processor 100 that causes the interrupt to be made inactive. In various examples, the interrupt control 130 can indicate to the instruction decode and execute engine 110 whether an interrupt has been sent, whether an interrupt is active, and/or whether an active interrupt has been cleared.

Instructions that can be implemented by the instruction decode and execute engine 110 can include a reconfigurable instruction. In various examples, the reconfigurable instruction is one instruction whose fields can result in the instruction decode and execute engine 110 performing no operations, one operation, or multiple operations. Some operations, if enabled, occur automatically, while some operations can further be controlled by configuration registers. Use of configuration registers to control the operations performed when the reconfigurable instruction is decoded enables the operations that are performed to be changed, without the instruction itself needing to be changed. Examples of different operations that can result from execution of the reconfigurable instructions are discussed further below, with respect to FIG. 2.

In various examples, the instruction decode and execute engine 110 of FIG. 1 can include a hardware pipeline for executing instructions. In these examples, the different operations of the reconfigurable instruction can be executed in different stages of the pipeline, or simultaneously in the same stage, as discussed further below.

In various examples, the instruction decode and execute engine 110 can implement a state machine to control the operations of the hardware pipeline. The state machine can determine the current and next execution state of the processor 100. For example, in a "running" state, the instruction fetch engine 106 will fetch the next instruction and the instruction decode and execute engine 110 will decode and execute the instruction. As another example, when the instruction is a wait instruction, the state machine can transition into a "waiting" state. In this example, the instruction decode and execute engine 110 can check the wait condition on each clock cycle, and when the wait condition is satisfied, can return the state machine to the "running" state. As another example, the state machine can be in one of several different "pending" states, which the instruction decode and execute engine 110 will remain in until a condition is satisfied. Examples of such conditions include synchronization condition being satisfied and/or the processor 100 entering a quiet state, among others.

In various examples, the output interface 114 provides the processor 100 with an interface through which the processor 100 can output data to other components in the computing system. The output interface 114 can, for example, connect to a communication fabric in the computing system. The output interface 114 can be implemented, for example, as an AXI master interface, for connecting to an AXI bus structure. In various examples, other bus structures and bus protocols can be used.

In various examples, the configuration registers 116 enable certain operations of the processor 100 to be modified when the processor 100 is in operation, and/or can provide a place from which information about the processor 100 can be read. For example, the configuration registers 116 can include registers for enabling or disabling interrupts that can be generated from the processor 100. As a further example, the configuration registers 116 can control the operations performed by reconfigurable instructions. The configuration registers 116 can further include, for example, registers from which a current execution state, current timestamp, statistics, or other data can be read.

In various examples, the configuration registers 116 can be read from and written to through a combined input/output interface 118. The combined input/output interface 118 can provide the processor 100 with an alternate communication path to other components in the system. This path can be slower than the paths used by the input interface 102 and the output interface 114, or may provide a more direct connection to the primary processor. In some examples, the combined input/output interface 118 is optional, and the processor 100 receives transactions for the configuration registers 116 at the input interface 102, and sends data form the configuration registers 116 out through the output interface 114.

Figure 2:
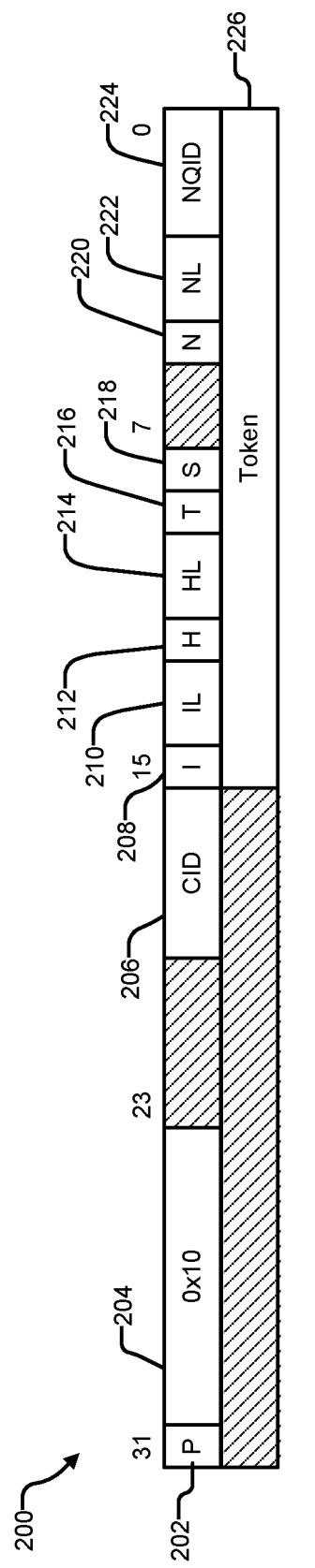
FIG. 2 includes a diagram illustrating an example description for a reconfigurable instruction.

FIG. 2 includes a diagram illustrating an example description for a reconfigurable instruction 200. The reconfigurable instruction 200 described in this diagram can be implemented by a processor, such as the process illustrated in FIG. 1. In the example illustrated in FIG. 2, the instruction is 64 bits long, and for convenience is illustrated in two 32-bit parts. Bits that are not used are indicated with cross hatching. This diagram is provided as one example of a reconfigurable instruction, with the understanding that variations on the format, including the number of bits, the specific fields, the placement of the fields, and/or the capabilities provided by the fields are possible.

The first part of the example reconfigurable instruction 200 includes a phase bit 202, an opcode 204, a counter identifier 206, an interrupt enable 208, an interrupt level 210, a halt enable 212, a halt level 214, a soft reset enable 216, a sync enable 218, a notify enable 220, a notify level 222, and a notification queue identifier 224. The second part of the reconfigurable instruction 200 includes a token 226. These fields can trigger the processor to execute up to six operations: sending a notification message, sending an interrupt, halting execution of instructions, synchronizing the processor's current execution state, performing a software reset, and/or performing no operations. In other examples, more, fewer, and/or other operations can be included in the reconfigurable instruction 200.

The phase bit 202 ("P") can be used to debug program code that includes the reconfigurable instruction 200. The phase bit 202 can be set to a particular value when the reconfigurable instruction 200 is written to the processor's instruction memory, and can be compared against a phase value maintained by the processor. When the value of the phase bit 202 does not match the current phase value maintained by the processor, the processor can generate a notification message, can generate an interrupt, and/or can halt or stall (e.g., stop further execution of instructions). In this way, the phase bit can be used to determine whether the processor's execution of program code is not synchronized to the loading of the code into the processor's instruction memory. In various examples, the processor's phase value can be set to a first value (e.g., 0) when the processor experiences a reset (e.g., a hardware reset, a software initiated reset, or a configuration reset, for example) and toggles between the first value and a second value (e.g., 1) whenever all of the instructions in the instruction memory have been executed and the instruction fetch pointer returns to the first instruction in the instruction memory. In various examples, checking of the phase bit can be enabled through a configuration register in the processor.

The opcode 204 is a field in the reconfigurable instruction 200 that identifies the reconfigurable instruction 200 to the processor's instruction decode circuit. In this example, the hexadecimal value "0x10" identifies the instruction as the reconfigurable instruction, which can be identified by the label NOTIFY_HALT in assembly code for the processor. Each instruction in the instruction set for the processor uses a different opcode value. In this example, the opcode field is seven bits long, such that the processor can implement up to 128 instructions.

The phase bit 202 and the opcode 204 of this example are fields that would be included in all the instructions that the processor implements. The opcode 204, in particular, distinguishes each instruction in the instruction set from the others. Any further bits in an instruction can be defined according to the requirements of each particular instruction, and thus may be different between one instruction and another.

The notify enable 220 field ("N") enables output of a notification message. The notification message, which can also be referred to herein as an explicit notification, enables the program code to output some information, similar to putting a print statement in the code but without the overhead of having to conduct Input/Output (I/O) operations. The notification message can include, for example, a timestamp, the value of a counter indicated by the counter identifier 206, and the value in the token 226 field, among other possible information.

In various examples, the processor generates a write transaction for the notification message, which causes the notification to be written to a storage location external the processor. In various examples, the storage location is in processor memory; that is, the memory used by the host processor for storing data that the host processor is in the process of using. The processor memory can be, for example, configured with queues for storing notification messages. In these examples, the queue to which a notification message is to be written can be identified by the notification queue identifier 224 ("NQID"). The queues enable the program code to put notification messages of different types into different queues. For example, notification messages that are unrelated can be put into different queues, while notification messages that are related or are of a same type can be put into the same queue.

The counter identifier 206 ("CID") can be used to identify a counter whose value is to be included in the notification message. The counter can be one of multiple counters that is maintained by the processor. In this example, the counter identifier 206 is four bits long in order to identify one of sixteen counters. In various examples, a counter is a register that is incremented or decremented by program instructions. Counters can be used for various purposes by program code. For example, the program code can use a counter to count a number of iterations of a loop in the code, or the number of times a certain instruction or set of instructions occurs. In some examples, the processor does not modify a counter other than at the direction of instructions in the program code (e.g., instructions for setting a value in the counter, incrementing the counter, or decrementing the counter, among others). When the notify enable 220 field is enabled, the outgoing notification message can include a value of the counter at the time the reconfigurable instruction 200 is decoded.

While the notify enable 220 can be used to indicate whether the reconfigurable instruction 200 can produce a notification message, the notify level 222 ("NL") can control whether the processor will generate the notification message on any particular execution of the instruction. In this example the notify level 222 is a two-bit field, and thus can contain a number between zero and three. Whenever the processor decodes a particular instance of the reconfigurable instruction 200, the processor can also read a configuration register associated with the reconfigurable instruction 200. The configuration register can contain a level value, which can be referred to as a notification debug level, for controlling the output of notification messages. In some examples, the debug level can also be referred to as a verbosity level, meaning that, at a higher verbosity level, more notifications will be output by instances of the reconfigurable instruction 200. When, for example, the value of the notify level 222 field is less than or equal to the notification debug level in the configuration register, then the processor will generate a notification message (e.g., queue a write transaction for sending the notification message); otherwise, the notification message is not sent. In other examples, a different comparison can be used, such as whether the notify level 222 field is greater than the notification debug level in the configuration register, or whether the values are equal.

The notification debug level in the configuration register can thus determine whether any particular occurrence of the reconfigurable instruction 200 will generate a notification message. Additionally, because the configuration register can be written at any time while the processor is running, whether a particular occurrence of the reconfigurable instruction 200 will generate a notification message can change between one execution of the same instruction and another. Writing of the configuration register can be performed, for example, by a driver program that manages the processor, possibly upon receiving input from a user. An example usage of the notify level 222 is as follows: a program can be run on the processor, and can then be run again with a different notification debug level set, so that on the second running the program will cause the processor to output some notification messages, without the program needing to be rewritten or recompiled. Additionally, use of a multi-bit field for the notify level 222 means that the program can be written so that only some notification messages can be enabled with one setting of the configuration register, and more notification messages can be enabled with a different setting of the configuration register. In some examples, the notify level 222 may not be included in the reconfigurable instruction 200, such that only the notify enable 220 field is needed to cause notification message to be generated.

Generation of interrupts at the direction of the reconfigurable instruction 200 can be controlled the same way. The interrupt enable 208 field ("I") enables outputting of an interrupt when the reconfigurable instruction 200 is executed. The interrupt level 210 ("IL") field can control whether the interrupt should be output on any particular execution of one instruction. As with the notification message, the processor can read a configuration register upon decoding the reconfigurable instruction 200. The configuration register can include a debug level value for interrupts, and if the value in the interrupt level 210 field is less than or equal to (for example) the interrupt debug level, then the processor will output an interrupt. Thus, whether any particular instance of the reconfigurable instruction 200 will output an interrupt can be controlled at run time. In various examples, generation of an interrupt, alone, will not stop the processor from further execution of instructions.

The halt operation of the reconfigurable instruction 200 can also be controlled in a similar manner. The halt enable 212 field ("H"), when set, can cause the processor to stop executing further instructions after executing the reconfigurable instruction 200. By enabling halt, an instance of the reconfigurable instruction 200 can be used as a software breakpoint, for debugging purposes, for example. While the processor is halted, operations other than the fetching and execution of instructions can continue. For example, the processor can continue to receive read and write transactions, and can execute these transactions. Halting in this manner can also be referred to as stalling. In various examples, the processor can exit the halted state when the processor receive an external write transaction that causes the processor to advance to another instruction. For example, the processor can receive a write transaction that moves the pointer that indicates the next instruction to fetch to a new location. As another example, the processor can receive a write transaction for a configuration register that, when written to, takes the processor out of the halt state.

The halt level 214 ("HL") can control whether any particular execution of the reconfigurable instruction 200 will cause halt or stalling of instruction execution. When the processor decodes the reconfigurable instruction 200, the processor can read a configuration register, which can include a debug level value for halts. When, for example, the value in the halt level 214 field is less than or equal to the halt debug level, the reconfigurable instruction 200 will cause the processor to halt; otherwise, the halt enable 212 is ignored, and the processor will continue to execute instructions. The halt enable 212 and the halt level 214 can thus be used to code stopping points into program code, which can be enabled or disabled at run time. Additionally, use of a multi-bit halt level 214 means that only some stopping points can be enabled for any particular execution of the program.

The sync enable 218 ("S"), when enabled, can cause the processor to pause executing further instructions until certain operations have completed. These operations can include, for example, transmission of a write transaction (generated as a result of the notify enable 220 being enabled) from the processor. In this example, the operations can possibly also include receiving a response indicating that the write transaction has completed. As a further example, the operations upon which the processor waits can include outputting of an interrupt generated as a result of the interrupt enable 208 being enabled. In this example, the operations can possibly also include receiving an acknowledgement that the interrupt was received. As a further example, the operations can include waiting for all outbound transactions in the processor's outgoing transaction queue being sent, and possibly also acknowledged.

In these and other examples, the sync enable 218 in the reconfigurable instruction 200 can be used to make the processor wait until operations triggered by prior instructions have completed. The state of the processor after the reconfigurable instruction 200 can thus be known. In various examples, once all the synchronization conditions have been satisfied, the processor can resume execution of instructions.

In the example of FIG. 2, the reconfigurable instruction 200 does not include a debug level field for the sync enable 218. Thus, synchronization will always occur when an instance of the instruction 200 has the sync enable 218 enabled. In other examples, the instruction can include a sync debug level field that can be used to selectively enable, at run time, synchronization.

The soft reset enable 216 ("T"), when enabled, performs a software reset. The soft reset enable 216 operates similarly to the sync enable 218. That is, the processor will pause further execution of instructions until a set of conditions have been met. In some examples, the conditions are the same as those that must complete for a synchronization condition to be satisfied. For example, all pending outbound transaction may need to complete, and any interrupts generated by the processor may need to have been issued. In some examples, there may be additional conditions that may need to be met. For example, any transactions received by the processor may have to complete, and if any new transactions are received while the processor is handling prior received transactions, these transactions must also complete. As another example, the processor may need to be in a quiet or quiescent state, in which the processor has no internal operations currently being executed or pending. In this state, the processor is effectively idle, except for not having completed execution of the instruction 200.

In these and other examples, once the processor has reached a quiescent state, the soft reset enable 216 will cause the processor to reset some or all of the operations of the processor and enter a halt state. For example, the processor can reset reading of the instruction memory 104 (e.g., by resetting the instruction fetch engine 106), so that the instruction memory appears to have no instructions to read. In this example, the instruction memory 104 can be, though need not be, reset or erased. As a further example, the processor can reset the instruction decode and execute engine to an idle or ready state. Other memories and registers, including the configuration registers, may or may not be erased as a result of performing a reset. In some examples, the configuration registers are not erased so that the configuration of the processor can be preserved after the software reset.

In the preceding, the processor is described as having different debug levels stored in one or more configuration registers, one each for notifications, interrupts, and halts. In some examples, the processor's configuration registers can store one debug level value, which can be used for notifications, interrupts, and halts, instead of individual debug levels for each. Alternatively or additionally, one debug level value in the registers can be used for one or more of the notifications, interrupts, or halts.

In various examples, the various enable fields in the reconfigurable instruction 200 can cause the processor to perform one operation or multiple operations, depending on the fields that are enabled and possibly also corresponding debug level values. With none of the enable fields set, or with the processor being configured with debug levels that suppress any fields that are enabled, the reconfigurable instruction 200 can cause no operations to be performed. The one instruction can thus be used in place of what would otherwise require (in this example) six instructions: notify, interrupt, halt, sync, soft reset, and no operation ("nop"). The reconfigurable instruction 200 thus enables more compact code size, in addition to allowing the behavior of the reconfigurable instruction 200 to be changed without the code itself needing to be changed.

Figure 3:
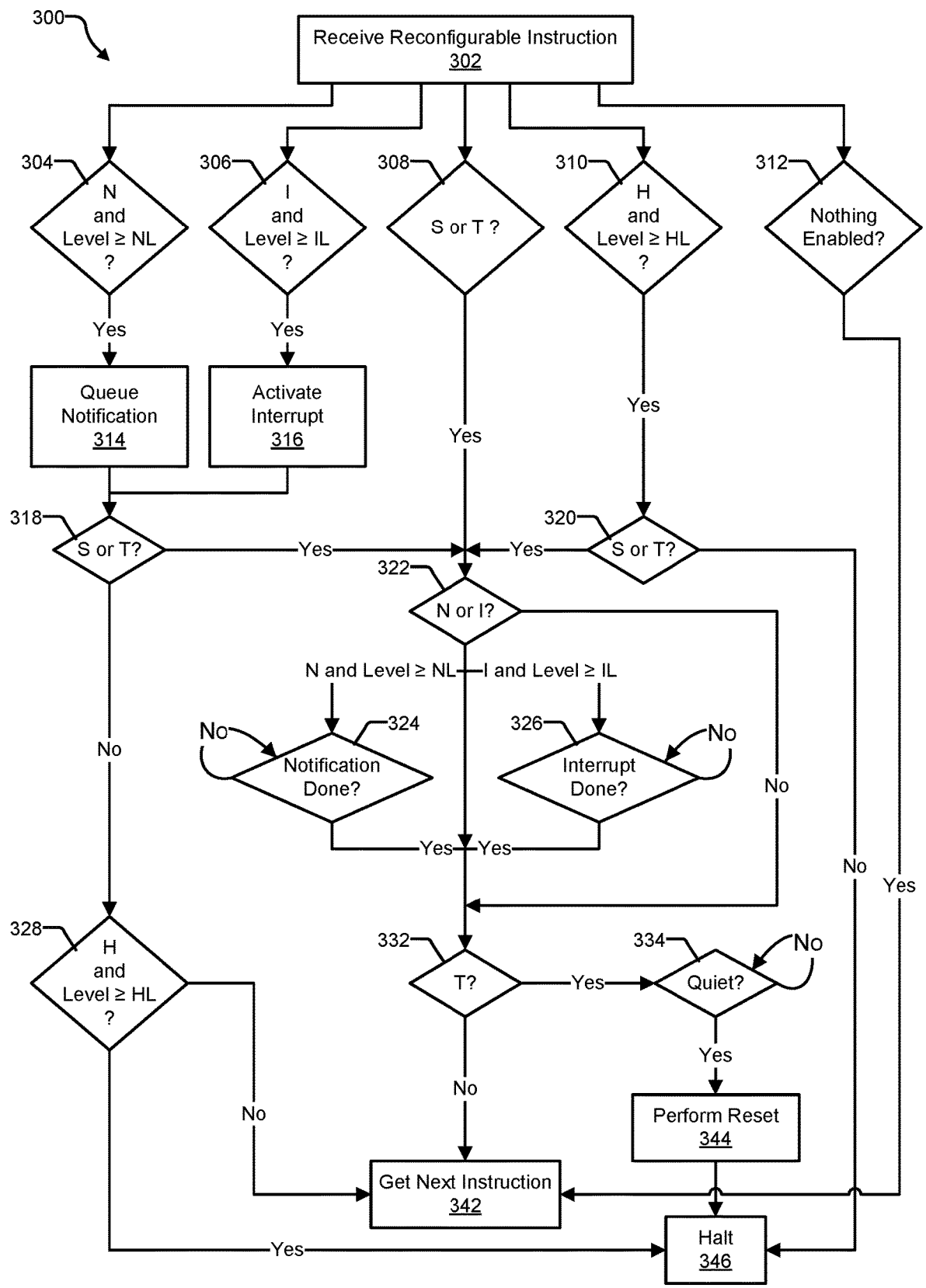
FIG. 3 includes a flowchart that illustrates a possible execution flow 300 for a reconfigurable instruction.

FIG. 3 includes a flowchart that illustrates a possible execution flow 300 for a reconfigurable instruction. The example execution flow 300 illustrates steps performed in the execution of a single instance of a reconfigurable instruction. As discussed further below, the same instruction may flow through different steps in the execution flow 300 at different times the instruction is executed. The steps of the flowchart can be executed, for example, by an instruction decode and execute engine of a processor, such as the processor illustrated in FIG. 1. The steps in the flowchart of FIG. 3 further approximate steps that can be performed in different stages of a hardware pipeline for executing instructions, which can be a part of the processor. For example, some steps can be performed in parallel (e.g., in the same pipeline stage) or sequentially (e.g., in different pipeline stages), while some steps can only be performed sequentially.

At step 302, the example execution flow 300 includes determining that a reconfigurable instruction has been received. The reconfigurable instruction can be received, for example, from an instruction fetch circuit of the processor, which read the instruction from an instruction memory. Identifying any instruction can include, for example, extracting an opcode field from the instruction and identifying the instruction from the opcode. The opcode can further inform how the rest of the instruction is to be read. For example, the opcode can configure an instruction execution pipeline with the bit offsets and bit lengths of the fields in the instruction. For the reconfigurable instruction, the fields can include notify enable, interrupt enable, sync enable, soft reset enable, and halt enable, among others. These fields are indicated in FIG. 3 by the letters "N," "I," "S," "T," and "H," respectively. Other instructions can have similar or different fields.

The execution flow 300 next includes determining the operations enabled by the reconfigurable instruction. Determining the operations enabled can include, at step 304, determining whether sending of a notification is enabled; at step 306, determining whether sending of an interrupt is enabled; at step 308, determining whether to perform a sync or a soft reset; at step 310, determining whether to perform a halt; and, at step 312, determining whether no operations are enabled. Steps 304, 306, 308, 310, and 312 can occur concurrently, for example using a set of comparators that receive bits from the instruction in the same clock cycle. Alternatively, or one or more of steps 304, 306, 308, 310, and 312 can occur sequentially.

At step 302, the processor can determine that the notify enable field in the reconfigurable instruction is set. The processor can further compare a notification debug level to the value of a notify level field in the instruction. As discussed above, the processor can read the notification debug level from a configuration register. In the example of FIG. 3, the processor will determine whether the notification debug level is greater than or equal to the value of the notify level. In other examples, at step 302, the processor can use a different comparison, such as equal to, not equal to, less than, or another comparison operator.

When both the notify is enabled and comparison of the notification debug level to the notify level indicates that the notification is to be generated, then, at step 314, the execution flow 300 includes queuing a notification. Queueing a notification can include placing a write transaction in an outbound transaction queue, where the write transaction includes the notification message. As discussed above, the message can include information indicated by the instruction, such as a counter identifier, a counter value, and a token value, among other information. In various examples, the write transaction may be output by the processor one or two clock cycles after being queued, or may be queued behind other transactions, and thus multiple clock cycles may pass before the write transaction is output.

Once, at step 314, the notification is queued, the execution flow 300 can proceed to step 318, where the processor determines whether the sync field or the soft reset field in the reconfigurable instruction are set. When either sync or soft reset are enabled, the execution flow 300 proceeds to step 322, which is discussed further below.

When the processor determines, at step 318, that neither sync nor soft reset are enabled, then the execution flow 300 proceeds to step 328, where the processor determines whether to perform a halt. In the example of FIG. 3, the processor will perform a halt when the halt field in the reconfigurable instruction is set, and a halt debug level is (in this example), greater than or equal to the value of a halt level field in the instruction. When both of these conditions are true, then the execution flow 300 can proceed to step 346, where the processor enters into a halt state. In the halt state, the processor can stop further execution of instructions. In some examples, the processor can be made to continue execution of instructions by a write transaction received from an external source, which can take the processor out of the halt state and/or trigger fetching of a new instruction.

When, at step 328, the processor determines that either the halt enable is not set in the reconfigurable instructions, or that the halt debug level is not greater than or equal to the halt level, then the execution flow 300 proceeds to step 342, at which the processor will get and execute the next instruction.

At step 306, the processor can determine that the interrupt enable field in the reconfigurable instruction is set. The processor can further compare an interrupt debug level to the value of an interrupt level field in the instruction. As discussed above, the processor can read the interrupt debug level from a configuration registers. In the example of FIG. 3, at step 306 the processor users a greater than or equal to comparison operator. In other examples, at step 306, the processor can use a different comparison operator.

When both the interrupt is enabled and comparison of the interrupt debug level and the interrupt level indicates that the interrupt is to be generated, then, at step 316, the execution flow 300 includes activating the interrupt. Activating the interrupt can include, for example, sending a signal to an interrupt controller of the processor, which causes the interrupt controller to output an interrupt on an interrupt output pin of the processor. In some examples, the interrupt controller can further set a register that stores a current state of the interrupt. The interrupt signal may be output from the processor within a few clock cycles (e.g., one or two or more clock cycles) of the interrupt being activated.

Once, at step 316, the interrupt is activated, the execution flow 300 can proceed to step 318, and follow the same steps that follow queueing of the notification at step 314. In various examples, queueing of the notification, at step 314, and activation of the interrupt, at step 316, can occur concurrently or can occur sequentially. In either case, step 318 occurs only when both steps 314 and 316 have completed.

At step 308, the processor can determine whether the sync field of the reconfigurable instruction is enabled or the soft reset field is enabled. In the example of FIG. 3, sync and soft reset are not associated with level fields, and thus either operation can be activated by just a respective enable field. In other examples, the reconfigurable instruction can include a sync level field and/or a soft reset level field.

When either sync or soft reset is enabled in the reconfigurable instruction, then the execution flow 300 proceeds to step 322. At step 322, the execution flow 300 includes determining whether notifications or interrupts were also enabled in the reconfigurable instruction. When neither notifications nor interrupts were also enabled, then the execution flow 300 proceeds to step 332, which is discussed further below.

When, at step 322, the processor determines that notifications or interrupts were enabled, the processor will further determine whether the debug levels for notifications and interrupts actually caused an notification to be queue and/or interrupt to be activated. When the debug levels are set such that neither a notification nor an interrupt was generated, then the execution flow 300 will proceed to step 332.

When the notification debug level is set such that a notification was queued (at step 314), then the execution flow 300 proceeds to step 324, and waits for the notification to reach a completed state. Completed can mean, for example, that the write transaction containing the notification has been output by the processor. Alternatively, completed can mean that the write transaction has been received, for example at a queue configured in host processor memory. In this case, receipt of the write transaction can be indicated to the processor by a completion response, received at the processor's output interface. When, at step 324, the processor determines that the notification is not yet done, the execution flow 300 remains at step 324, for example for an additional clock cycle. In some examples, the instruction execution pipeline may stall so long as the condition at step 324 is not satisfied, thus possibly preventing other instructions from completing. Otherwise, the execution flow 300 proceeds to step 332.

When the interrupt debug level is set such that an interrupt was activated (at step 316), then the execution flow 300 proceeds to step 326, and waits for the interrupt to reach a completed state. Completed can mean, for example, that the interrupt is output from the processor. Alternatively, completed can mean that the interrupt has been acknowledged, for example by a host processor. In this case, acknowledgement can come in the form of a transaction from the host processor, indicating receipt of the interrupt. Alternatively, completed can mean that the interrupt is cleared by the host processor, which can occur when the host processor writes to a register that stores the current state of the interrupt. When, at step 326, the processor determines that the interrupt is not yet done, then the execution flow 300 can remain at step 326, for example for another clock cycle. In some examples, remaining at step 326 can cause the instruction execution pipeline to stall, or otherwise stop processing instructions. Otherwise, the execution flow 300 proceeds to step 332.

In various examples, steps 324 and 326 can occur concurrently or sequentially. That is, in the same pipeline stage, the processor can check both whether the notification is done and whether the interrupt is done, or the processor can check these conditions in sequential pipeline stages. In either case, when both conditions are being checked, the processor proceeds to step 332 only when both conditions are satisfied.

At step 332, the processor can determine whether soft reset is enabled, or only sync is enabled. When only sync was enabled (e.g., soft reset is not enabled), then the execution flow 300 proceeds to step 342, and the processor continues to the next instruction. When, at step 332, the processor determines that soft reset is enabled (e.g., sync may or may not also have been enabled), the execution flow 300 proceeds to step 334.

At step 334, the processor determines whether the processor has reached a quiet state. In some cases, satisfying step 324 and step 326 can result in the processor being in a quiet state by the time step 334 is reached. In some examples, the processor may need to wait for other operations to complete before the test at step 334 is satisfied. For example, the processor may also wait for all inbound transactions to be completed and/or for outstanding events to be cleared. While the processor is not in the quiet state, the execution flow 300 can remain at step 334, for example for an additional clock cycle. In some examples, steps 332 and step 334 can occur in the same pipeline stage or in sequential pipeline stages.

Once the condition at step 334 is satisfied, the execution flow 300 proceeds to step 344, which includes performing reset operations. The reset operations can include, for example, resetting instruction memory pointers, so that the processor is put in a state where the processor has no instructions to execute. For example, a pointer to a next instruction to execute can be set to a first instruction in an instruction memory, and a count of instructions to execute can be set to zero. In some examples, step 344 can include other operations, such as clearing memories and/or registers. In various implementations, the operations of step 344 can occur as a result of outputs from a pipeline stage, such as the stage in which step 334 is performed.

Once reset operations at step 344 are completed, the execution flow 300 proceeds to step 346, where the processor halts further execution of instructions. Step 346 can include, for example, putting the instruction execution state machine in a "halt" state, from which the state machine expects to receive a "continue" signal before advancing to any other state. In the halt state, the instruction execution state machine can, for example, output a signal to the instruction fetch circuit that prevents the instruction fetch circuit from advancing to a next instruction. The continue signal may occur when, for example, the processor receives an external write transaction (e.g., from a host processor) that tells the processor to continue executing instructions.

Returning to step 310, at this step, the processor can determine whether the halt field in the reconfigurable instruction is enabled. The processor can further compare a halt debug level to the value of a halt level field in the instruction. As discussed above, the processor can read the halt debug level from a configuration register. In the example of FIG. 3, the processor uses a greater than or equal to comparison operation. In other examples, the processor can use a different comparison operator. It should be noted that the operations performed at step 310 are the same as the operations performed at step 328.

When both the halt is enabled and the comparison of the halt debug level to the halt level indicates that a halt should occur, the execution flow 300 will proceed to step 320. At step 320, the processor determines whether sync or soft reset is enabled in the reconfigurable instruction. When either sync or soft reset is enabled, the execution flow 300 proceeds to step 322, which is discussed above. Otherwise, the execution flow 300 proceeds directly to step 346, and the processor halts further execution of instructions.

In some examples, instead of proceeding from step 320 to step 346, from step 320 the execution flow 300 can include waiting on a notification, queued at step 314, and/or an interrupt, activated at step 316, to be completed before proceeding to step 346.

Step 312 can occur when none of tests at steps 304, 306, 308, or 310 are true. That is, at step 304, either the notify field is not enabled or the notification debug level does not activate the notification; at step 306, the interrupt field is not enabled or the interrupt debug level does not activate the interrupt; at step 308 neither the sync field nor the soft reset field is set; and, at step 310, either the halt field is not enabled or the halt debug level does not enable halting. In this situation, the processor can determine, at step 312, to proceed directly to step 342, and get the next instruction.

Examples of the reconfigurable instruction are now provided, to illustrate the operation of the execution flow 300. The examples each illustrate different instances of the instruction as these instances may appear in program code. Also in these examples, a value of one indicates that an operation is enabled and a value of zero indicates that an operation is disabled. In these examples, it is also assumed that the processor determines whether a debug level is greater than or equal to a corresponding level value from the instructions to determine whether an operation should be enabled. A first example is as follows:

NOTIFY_HALT (P=0, N=1, NL=0, NQID=4, I=0, IL=0, H=1, HL=1, T=0, S=0, TOKEN=0x1000, CID=5)

In this example, the phase bit is set to zero, the notify field is set to one, the notify level is set to zero, the notification queue identifier is set to 4, the interrupt field is set to zero, the interrupt level is set to zero, the halt field is set to one, the halt level is set to one, the soft reset field is set to zero, and the sync field is set to zero, the token field has a value of "0x1000," and the counter identifier field has a value of "5." This example instruction will thus not activate an interrupt, nor perform a soft reset, nor perform a sync. Instead, the instruction can queue a notification, and may perform a halt. For example, with the notification level set to zero, a notification debug level of zero or greater can be used to cause the example instruction to generate a notification. In other words, in this example, any value for the notification debug level can enable the notification generation, thus this example instruction will generate a notification each time the instruction is executed. In this example, the notification message will include the token value of "0x1000" and a value taken from counter five, as well as the counter identifier, among other possible information. Additionally, the notification message will be written to queue identified as queue "4."

In contrast, the halt level value of one means that a halt debug level of one or greater is needed for halt to be enabled. Thus, the example instruction will cause the processor to halt only when the processor is configured with a value of one or greater for the halt debug level. As an example, the default configuration for the processor may be a halt debug level of zero. Upon running a program that includes the preceding example instruction, the program may perform in an unexpected or undesirable manner. The processor can then be reconfigured with a halt debug level of one, and be run again. On the second running, the processor will stop at the example instruction, and not execute any further instructions until enabled to proceed.

A second example of the reconfigurable instruction is as follows:

NOTIFY_HALT (P=0, N=1, NL=2, NQID=4, I=1, IL=2, H=0, HL=0, T=0, S=1, TOKEN=0x1000, CID=5)

In this example, the phase bit is set to zero, the notify field is set to one, the notify level is set to two, the notification queue identifier is set to 4, the interrupt field is set to one, the interrupt level is set to two, the halt field is set to zero, the halt level is set to zero, the soft reset field is set to zero, and the sync field is set to one, the token field has a value of "0x1000," and the counter identifier field has a value of "5." This example instruction will not activate halt or a soft reset, will perform a sync, and may or may not output a notification and/or an interrupt.

Specifically, in this example, the processor needs to be configured with a notification debug level of at least two for the example instruction to generate a notification. Otherwise, the instruction, when executed, will not generate a notification. Similarly, the processor needs to be configured with an interrupt debug level of at least two for the instruction to cause the processor to output an interrupt. Thus, depending on the configuration of the processor, the example instruction can generate a notification or generate an interrupt, or generate both a notification and an interrupt. As in the prior example, the notification message will include the token value of "0x1000" and a value taken from counter five, and be written to queue "4."

Sync being enabled in this example instruction further means that the processor will wait at the instruction until the notification, if generated, completes, and the interrupt, if generated, completes. That is, the processor will not proceed to a next instruction until the notification and/or interrupt have completed. When neither the notification nor the interrupt are generated, then the processor need not wait for any sync condition to be met. The example instruction will thus not occupy any additional cycles, and the processor will proceed to the next instructions.

A third example of the reconfigurable instruction is as follows:

NOTIFY_HALT (P=0, N=1, NL=3, NQID=4, I=1, IL=3, H=1, HL=3, T=0, S=0, TOKEN=0x1000, CID=5)

In this example, the phase bit is set to zero, the notify field is set to one, the notify level is set to three, the notification queue identifier is set to 4, the interrupt field is set to one, the interrupt level is set to three, the halt field is set to one, the halt level is set to three, the soft reset field is set to zero, and the sync field is set to zero, the token field has a value of "0x1000," and the counter identifier field has a value of "5." This example instruction will not activate soft reset or a sync, and may perform one or more of queueing a notification, activating an interrupt, and/or halting.

Specifically, the processor needs to be configured with a notification debug level of at least three for the example instruction to generate a notification. Similarly, the processor needs to be configured with an interrupt debug level of three and a halt debug level of three for a interrupt to be activated or for a halt to occur, respectively. Thus in this example, depending on the configuration of the processor, the example instruction can generate a notification, or generate an interrupt, or halt, or generate a notification and halt, or generate an interrupt and halt, or generate both a notification and an interrupt and halt. In some examples, the processor waits for the notification and/or the interrupt to be completed before halting.

Alternatively, the instructions can cause the processor to neither generate a notification, nor generate an interrupt, nor halt. In this case, the instruction causes no operations to be performed. The instruction can thus complete as soon as the processor determines that the debug levels do not enable any operation.

Figure 4:
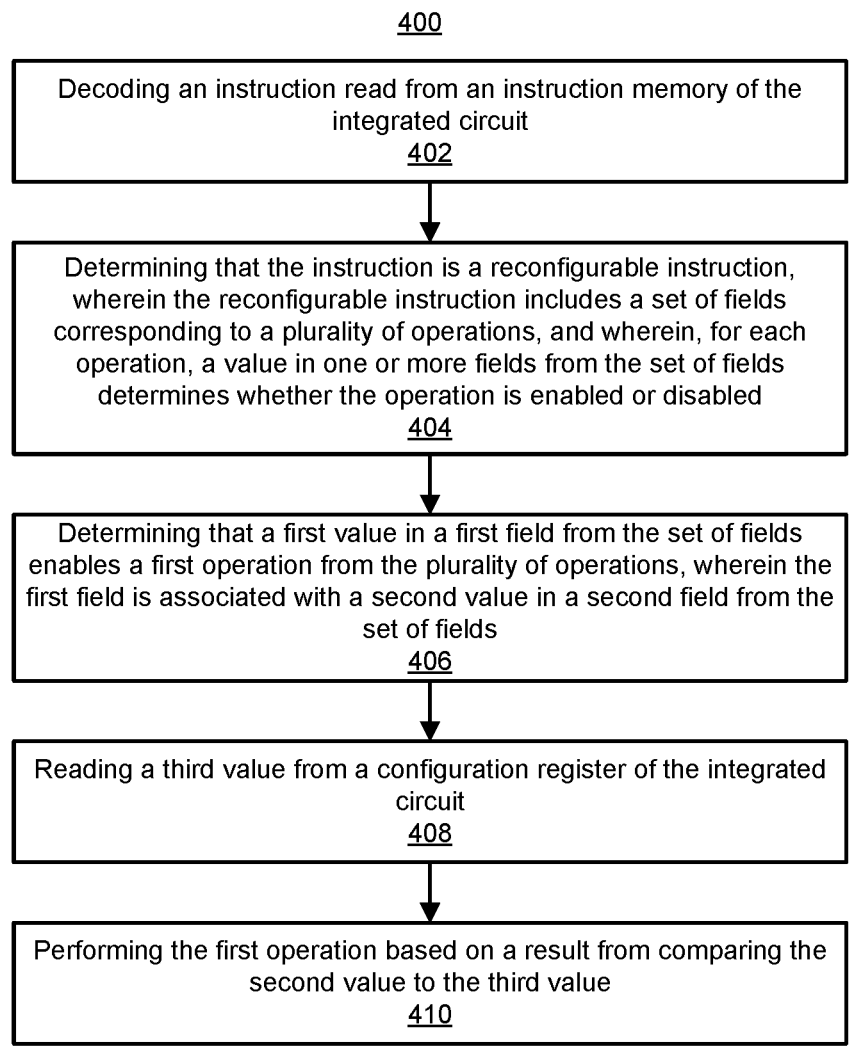
FIG. 4 illustrates an example of a process for operating an integrated circuit device.

FIG. 4 illustrates an example of a process 400 for operating an integrated circuit device. The example process 400 can be implemented by the systems described above, such as for example the processor illustrated in FIG. 1.

At step 402 of FIG. 4, the process 400 includes decoding an instruction read from an instruction memory of the integrated circuit. The memory can be operable to store instructions that are awaiting execution by the integrated circuit. In various examples, the integrated circuit includes an instruction fetch circuit that reads the instruction from the memory.

At step 404, the process 400 includes determining that the instruction is a reconfigurable instruction, wherein the reconfigurable instruction includes a set of fields corresponding to a plurality of operations, and wherein, for each operation, a value in one or more fields from the set of fields determines whether the operation is enabled or disabled. The integrated circuit can, for example, read an opcode field that identifies the instruction as the reconfigurable instruction. Based on the opcode, the processor can then determine the fields included in the instruction, and can use this information to read values from each of the fields.

At step 406, the process 400 includes determining, determining that a first value in a first field from the set of fields enables a first operation from the plurality of operations, wherein the first field is associated with a second value in a second field from the set of fields. The field can be, for example, a single bit field whose value enables or disabled the first operation. The second value can be from a multi-bit field in the instruction, and can be used to provide a number. In various examples, the operation can be one of sending a notification message, issuing an interrupt, synchronizing the execution state of the processor, halting further execution of instructions, and/or performing a software reset, among other examples.

At step 408, the process 400 includes reading a third value from a configuration register of the integrated circuit. The configuration register can be one of a set of configuration registers of the integrated circuit device. The configuration registers can be programmed at run time to configure various features of the integrated circuit device. The third value can be, for example, a debug level configured using a configuration register, which can be changed when the integrated circuit device is run without any changes needing to be made to the program code.

In some examples, the process 400 can further include determining, from a second field in the instruction, a second operation to be performed in executing the instruction. In these examples, the process 400 can further include determining that the second field is not dependent on a value in the configuration register. As a result of determining that the configuration register does not need to be read or checked, the process 400 can further include performing the second operation.

At step 410, the process 400 includes performing the first operation based on a result of comparing the second value to the third value. The comparison can be, for example, to determine whether the third value is greater than or equal than the second value, and when this is the case, the first operation will be performed, otherwise the first operation will be disabled.

In some examples, the process 400 can further include causing, as a result of performing the operation, the integrated circuit device to produce an output. In some examples, the output includes a message, the message including information indicated by the instruction. In some examples, the output includes an interrupt signal.

In some examples, the process 400 can include determining that a fourth value in a third field from the set of fields disables a second operation from the plurality of operations. That is, of the possible operations that can be triggered from the instruction, the values in the fields of the instruction can cause the first operation to be performed while the second operation is not performed.

In some examples, the process 400 can include determining that a fourth value in a third field from the set of fields enables a second operation from the plurality of operations, wherein the second field is associated with a fifth value in a fourth field from the set of fields. In this example, the process 400 can further include reading a sixth value from the configuration register, and determining not to perform the second operation based on a result of comparing the fifth value to the sixth value. That is a debug level configured for the first operation can enable the first operation, while a debug level for the second operation disables the second operation from being performed.

In some examples, the process 400 can further include determining, from the instruction, that a condition is associated with the instruction, halting further execution of instructions until the condition is met. In some examples, the condition is met when a message generated by the instruction has been transmitted by the integrated circuit device. In some examples, the condition is met when an interrupt signal activated by the instruction has been output. In some examples, the condition is met when all transactions outbound from the integrated circuit device have been transmitted. In some examples, the condition is met when the integrated circuit device becomes idle. In some examples, when the condition is met, the integrated circuit device resumes the execution of the instructions. In some examples, when the condition is met, the integrated circuit device becomes idle does not resume execution of the instructions In some examples, the process 400 can further include determining that a fourth value in a third field from the set of fields enables a second operation from the plurality of operations, wherein the second operation is a reset operation. In these examples, the process 400 can further include resetting operations of the integrated circuit based on the fourth value enabling the reset operation. For example, the integrated circuit can set instruction memory pointers such that it appears that the instruction memory does not have any instructions to execute.

In some examples, the process 400 can further include decoding the instruction a second time. For example, the instruction may be in a loop in the program code, or the program code may be run a second time. In these and other examples, the process 400 can further include reading the configuration register a second time, and determining not to perform the first operation based on a result of comparing the second value to the third value again. For example, on the second reading of the configuration register, the third value may have changed, such that comparing the second value to the third value a second time produces a different result.

In some examples, the process 400 can further include decoding a second instruction read from the instruction memory, and determining that the second instruction a second reconfigurable instruction. That is, the second instruction can be another instruction that includes the same opcode as the instruction decoded at step 402. In these examples, the process 400 can further include determining that the operation performed by the instruction is also enabled for the second instruction, and determining not to perform the operation upon determining that a third value included in the second instruction is greater than the second value.

In some examples, the process 400 can further include determining, from a second field in the instruction, to perform a second operation. In these examples, the second operation is performed upon a first decoding of the instruction and when the instruction is decoded the second time. In this example, performance of the second operation is not contingent on a value in the configuration register.

In some examples, the process 400 can further include determining, upon decoding the instruction the second time, that the instruction enables no operations.

Figure 5:
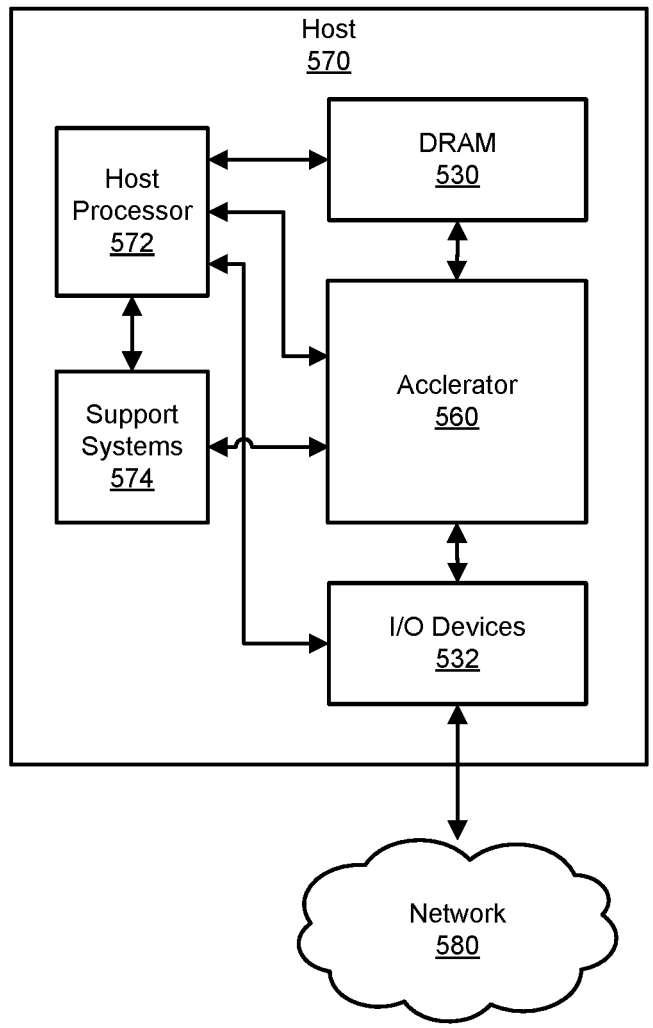
FIG. 5 includes a block diagram that illustrates an example of a host system in which an accelerator can be used.

FIG. 5 includes a block diagram that illustrates an example of a host system 570 in which an accelerator 560 can be used. The example host system 570 includes the accelerator 560, a host processor 572, DRAM 530 or processor memory, I/O devices 532, and support systems 574. In various implementations, the host system 570 can include other hardware that is not illustrated here.

The host processor 572 is a general purpose integrated circuit that is capable of executing program instructions. The host processor 572 can also be referred to as a CPU. The host processor 572 can be responsible for the overall management and control of the host system 570, including executing an operating system for the host system 570. In some examples, the host processor 572 can include multiple processing cores. In some examples, the host system 570 can include more than one host processor. In some examples, the host processor 572 and the accelerator 560 can be one chip, such as, for example, one or more integrated circuits within the same package.

The DRAM 530 can include memory that is used by the host processor 572 for storage of program code that the host processor 572 is in the process of executing, as well as for storage of values that are being operated on by the host processor 572. In some examples, the DRAM 530 is also accessible to the accelerator 560. In some examples, the DRAM 530 includes separate memory or memory banks for processor memory and for use by the accelerator 560. DRAM is a common term for small, fast memory used for processor memory, and though DRAM is volatile memory, in various examples volatile and/or non-volatile memory can be used.

The I/O devices 532 can include hardware for connecting to user input and output devices, such as keyboards, monitors, and printers, among other devices The I/O devices 532 can also include storage drives and/or a network interface for connecting to a network 580.

In various implementations, the support systems 574 can include hardware for coordinating the operations of the accelerator 560. For example, the support systems 574 can include one or more data management processors, which can management the movement of data into and out of on the accelerator 560. A data management processor is another example of an integrated circuit device that can be referred to as an accelerator. In some examples, the data management processors and the accelerator 560 can be on one device, such as one integrated circuit on the same die and in the same package.

In various examples, software programs executing on the host processor 572 can receive or generate input for processing by the accelerator 560. The programs can include, for example, graphics intensive programs such as video games or computer-aided design programs, computationally intensive programs such as modeling programs, or artificial intelligence programs such as speech recognition or image recognition programs. In various examples, the host processor 572 can determine to offload operations on input received from such programs to the accelerator 560, which can perform the operations more quickly than the host processor 572.

To assist the host processor 572 in using the accelerator 560, the host processor can be executing a device driver or driver program for the accelerator 560. Similar to any other hardware driver, the driver program for the accelerator 560 can provide an interface through which an operating system can send requests to the accelerator 560 and receive results. Upon receiving a request, which can include data and an operation to be performed on the data, the driver program can handle execution of the operation by the accelerator 560, leaving the operating system free to perform other operations.

In various examples, handling a request for the accelerator 560 can including programming and activating a data management processor, which may be a component in the support systems 574 or in the accelerator 560. Programming the data management processor can include, for example, triggering a DMA transaction to copy program code from the DRAM 530 to the data management processor, and triggering the data management processor to execute the code. Once the data management processor begins executing code, the driver program need not take further action until the operation being performed by the accelerator engine 560 is finished.

In various examples, the code executed by the data management processor can configure the accelerator 560, including copying program code and input data into the accelerator engine 560 and triggering the accelerator engine 560 to being execution of the code. The data management processor can wait on the accelerator 560 to finish perform the operation, and can then copy any result of the operation from the accelerator 560 and into DRAM 530, for example, the data management processor can then inform the driver program that results are ready, which can then inform the operating system or the program for which the result was computed.

In some examples, the operations of the support systems 574 can be handled by the host processor 572. In these examples, the support systems 574 may not be needed and can be omitted from the host system 570.

Figure 6:
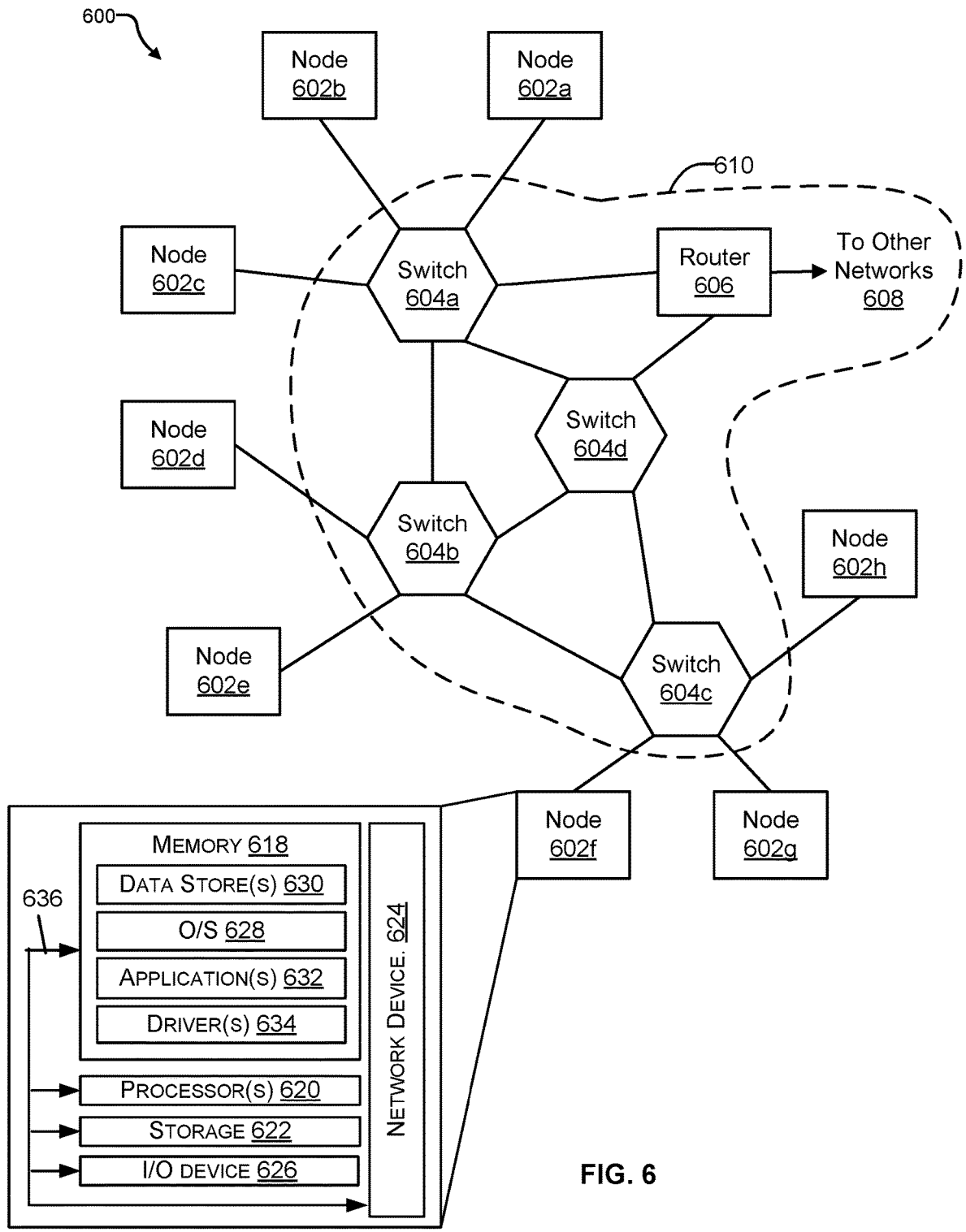
FIG. 6 illustrates an example architecture for features and systems described herein that includes one or more service provider computers and/or a user device connected via one or more networks, according to certain aspects of the disclosure.

FIG. 6 includes a diagram of an example network 600, which can include one or more host systems, such as the host system illustrated in FIG. 8. For example, the example network 600 of FIG. 6 includes multiple nodes 602a-602h, one or more of which can be a host system such as is illustrated in FIG. 5. Others of the nodes 602a-602h can be other computing devices, each of which include at least a memory for storing program instructions, a processor for executing the instructions, and a network interface for connecting to the network 600.

In various examples, the network 600 can be used to process data. For example, input data can be received at one of the nodes 602a-602h or from other networks 608 with which the network 600 can communicate. In this example, the input data can be directed to a node in the network 600 that includes an acceleration engine, for the acceleration engine to operate on and produce a result. The result can then be transferred to the node or other network from which the input data was received. In various examples, input data can be accumulated from various sources, including one or more of the nodes 602a-602h and/or computing devices located in the other networks 608, and the accumulated input data can be directed to one or more host systems in the network 600. Results from the host systems can then be distributed back to the sources from which the input data was gathered.

In various examples, one or more of the nodes 602a-602h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 6, the nodes 602a-602h are connected to one another using a switched architecture with point-to point links. The switched architecture includes multiple switches 604a-604d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 604a-604d of FIG. 6 may be connected to the nodes 602a-602h and provide multiple paths between any two nodes.

The network 600 may also include one or more network devices for connection with other networks 608, such as a router 606. Routers use headers and forwarding tables to determine the best path for forwarding the packets, and use protocols such as internet control message protocol (ICMP) to communicate with each other and configure the best route between any two devices. The router 606 of FIG. 6 can be used to connect to other networks 608 such as subnets, LANs, wide area networks (WANs), and/or the Internet.

In some examples, network 600 may include any one or a combination of many different types of networks, such as cable networks, the Internet, wireless networks, cellular networks and other private and/or public networks. The interconnected switches 604a-604d and the router 606, if present, may be referred to as a switch fabric 610, a fabric, a network fabric, or simply a network. In the context of a computer network, terms "fabric" and "network" may be used interchangeably herein.

The nodes 602a-602h may be any combination of host systems, processor nodes, storage subsystems, and I/O chassis that represent user devices, service provider computers or third party computers.

User devices may include computing devices to access an application 632 (e.g., a web browser or mobile device application). In some aspects, the application 632 may be hosted, managed, and/or provided by a computing resources service or service provider. The application 632 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 608. Additionally, the user device(s) may be part of the distributed system managed by, controlled by, or otherwise part of the service provider computer(s) (e.g., a console device integrated with the service provider computers).

The node(s) of FIG. 6 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 632 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 602a-602h may include at least one memory 618 and one or more processing units (or processor(s) 620). The processor(s) 620 may be implemented in hardware, computer-executable instructions, firmware, or combinations thereof. Computer-executable instruction or firmware implementations of the processor(s) 620 may include computer-executable or machine-executable instructions written in any suitable programming language to perform the various functions described.

In some instances, the hardware processor(s) 620 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 618 may store program instructions that are loadable and executable on the processor(s) 620, as well as data generated during the execution of these programs. Depending on the configuration and type of the node(s) 602a-602h, the memory 618 may be volatile (such as RAM) and/or non-volatile (such as ROM, flash memory, etc.). The memory 618 may include an operating system 628, one or more data stores 630, one or more application programs 632, one or more drivers 634, and/or services for implementing the features disclosed herein.

The operating system 628 may support nodes 602a-602h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 628 may also be a proprietary operating system.

The data stores 630 may include permanent or transitory data used and/or operated on by the operating system 628, application programs 632, or drivers 634. Examples of such data include web pages, video data, audio data, images, user data, and so on. The information in the data stores 630 may, in some implementations, be provided over the network(s) 608 to user devices. In some cases, the data stores 630 may additionally or alternatively include stored application programs and/or drivers. Alternatively or additionally, the data stores 630 may store standard and/or proprietary software libraries, and/or standard and/or proprietary application user interface (API) libraries. Information stored in the data stores 630 may be machine-readable object code, source code, interpreted code, or intermediate code.

The drivers 634 include programs that may provide communication between components in a node. For example, some drivers 634 may provide communication between the operating system 628 and additional storage 622, network device 624, and/or I/O device 626. Alternatively or additionally, some drivers 634 may provide communication between application programs 632 and the operating system 628, and/or application programs 632 and peripheral devices accessible to the service provider computer. In many cases, the drivers 634 may include drivers that provide well-understood functionality (e.g., printer drivers, display drivers, hard disk drivers, Solid State Device drivers). In other cases, the drivers 634 may provide proprietary or specialized functionality.

The service provider computer(s) or servers may also include additional storage 622, which may include removable storage and/or non-removable storage. The additional storage 622 may include magnetic storage, optical disks, solid state disks, flash memory, and/or tape storage. The additional storage 622 may be housed in the same chassis as the node(s) 602a-602h or may be in an external enclosure. The memory 618 and/or additional storage 622 and their associated computer-readable media may provide non-volatile storage of computer-readable instructions, data structures, program modules, and other data for the computing devices. In some implementations, the memory 618 may include multiple different types of memory, such as SRAM, DRAM, or ROM.

The memory 618 and the additional storage 622, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 618 and the additional storage 622 are examples of computer storage media. Additional types of computer storage media that may be present in the node(s) 602a-602h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 602a-602h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 602a-602h may also include I/O device(s) 626, such as a keyboard, a mouse, a pen, a voice input device, a touch input device, a display, speakers, a printer, and the like. The node(s) 602a-602h may also include one or more communication channels 636. A communication channel 636 may provide a medium over which the various components of the node(s) 602a-602h can communicate. The communication channel or channels 636 may take the form of a bus, a ring, a switching fabric, or a network.

The node(s) 602a-602h may also contain network device (s) 624 that allow the node(s) 602a-602h to communicate with a stored database, another computing device or server, user terminals and/or other devices on the network(s) 600.

In some implementations, the network device 624 is a peripheral device, such as a PCI-based device. In these implementations, the network device 624 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 624 may be connected to a computing system using a PCIe interface.

A PCI-based device may include one or more functions. A "function" describes operations that may be provided by the network device 624. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 624 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 6, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit device, comprising:
    an instruction memory operable to store instructions;
    a configuration register; and
    an execution circuit operable to execute the instructions, wherein executing the instructions includes:
        reading an instruction from the instruction memory a first time;
        determining, upon decoding the instruction, that the instruction is a reconfigurable instruction, wherein the reconfigurable instruction includes a set of fields corresponding to a plurality of operations, wherein, for each operation, a value in one or more fields from the set of fields determines whether the operation is enabled or disabled, and wherein, for a set of operations from the plurality of operations, whether the set of operations is enabled is further controlled by the configuration register;
        determining that a first value in a first field from the set of fields enables a first operation from the plurality of operations, wherein the first field is associated with a first level value in a second field from the set of fields, wherein the first level value indicates whether the first operation can be performed for a given execution of the reconfigurable instruction;
        determining that a second value in a third field from the set of fields enables a second operation from the plurality of operations, wherein the third field is associated with a second level value in a fourth field from the set of fields, wherein the second level value indicates whether the second operation can be performed for the given execution of the reconfigurable instruction;

reading a first debug level value and a second debug level value from the configuration register;
performing the first operation for the given execution of the reconfigurable instruction based on a result of comparing the first level value to the first debug level value; and
determining not to perform the second operation for the given execution of the reconfigurable instruction based on a result of comparing the second level value to the second debug level value.

2. The integrated circuit device of claim 1, wherein executing the instructions includes:
reading the instruction from the instruction memory a second time;
reading the first debug level value from the configuration register again;
determining not to perform the first operation based on a result of comparing the first level value to the first debug level value again.

3. The integrated circuit device of claim 2, wherein the integrated circuit device is operable to:
receive a write transaction addressed to the configuration register, wherein the write transaction is received between the first time and the second time.

4. An integrated circuit device, comprising:
an instruction memory operable to store instructions;
a configuration register; and
an execution circuit operable to execute the instructions, wherein executing the instructions includes:
determining that an instruction read from the instruction memory is a reconfigurable instruction, wherein the reconfigurable instruction includes a set of fields corresponding to a plurality of operations, and wherein, for each operation, a value in one or more fields from the set of fields determines whether the operation is enabled or disabled;
determining that a first value in a first field from the set of fields enables a first operation from the plurality of operations, wherein the first field is associated with a second value in a second field from the set of fields, wherein the second value indicates whether the first operation can be performed for a given execution of the reconfigurable instruction;
reading a third value from the configuration register; and
determining whether to perform the first operation, wherein the first operation is performed for the given execution of the reconfigurable instruction based on a result of comparing the second value to the third value.

5. The integrated circuit device of claim 4, wherein executing the instructions further includes:
determining that a fourth value in a third field from the set of fields disables a second operation from the plurality of operations.

6. The integrated circuit device of claim 4, wherein executing the instructions further includes:
determining that a fourth value in a third field from the set of fields enables a second operation from the plurality of operations, wherein the second field is associated with a fifth value in a fourth field from the set of fields, wherein the fifth value indicates whether the second operation can be performed for the given execution of the reconfigurable instruction;
reading a sixth value from the configuration register; and
determining not to perform the second operation based on a result of comparing the fifth value to the sixth value.

7. The integrated circuit device of claim 4, wherein executing the instructions further includes:
determining that a fourth value in a third field from the set of fields enables a second operation from the plurality of operations; and
performing the second operation based on the fourth value enabling the second operation.

8. The integrated circuit device of claim 4, wherein executing the instructions further includes:
determining that a fourth value in a third field from the set of fields enables a second operation from the plurality of operations, wherein the second operation is a reset operation;
resetting operations of the integrated circuit device based on the fourth value enabling the reset operation.

9. The integrated circuit device of claim 4, wherein performing the first operation causes the integrated circuit device to halt further execution of the instructions.

10. The integrated circuit device of claim 4, wherein executing the instructions further includes:
causing, as a result of performing the first operation, the integrated circuit device to produce an output.

11. The integrated circuit device of claim 10, wherein the output comprises a write transaction, the write transaction including a message, the message including information indicated by the instruction.

12. The integrated circuit device of claim 10, wherein the output comprises an interrupt signal.

13. The integrated circuit device of claim 4, wherein executing the instructions further includes:
determining, from the instruction, that a condition is associated with the instruction; and
stalling further execution of the instructions until the condition is met.

14. The integrated circuit device of claim 13, wherein the condition is met when transmission of a message generated by the instruction has been completed.

15. The integrated circuit device of claim 13, wherein the condition is met when an interrupt signal activated by the instruction has been output.

16. The integrated circuit device of claim 13, wherein the condition is met when all transactions outbound from the integrated circuit device have been transmitted.

17. The integrated circuit device of claim 13, wherein the condition is met when the integrated circuit device becomes idle.

18. The integrated circuit device of claim 13, wherein, when the condition is met, the integrated circuit device resumes execution of the instructions.

19. The integrated circuit device of claim 13, wherein, when the condition is met, the integrated circuit device halts further execution of the instructions.

20. A method of operating an integrated circuit, comprising:
decoding an instruction read from an instruction memory of the integrated circuit;
determining that the instruction is a reconfigurable instruction, wherein the reconfigurable instruction includes a set of fields corresponding to a plurality of operations, and wherein, for each operation, a value in one or more fields from the set of fields determines whether the operation is enabled or disabled;
determining that a first value in a first field from the set of fields enables a first operation from the plurality of operations, wherein the first field is associated with a second value in a second field from the set of fields, wherein the second value indicates whether the first operation can be performed for a given execution of the reconfigurable instruction;

reading a third value from a configuration register of the integrated circuit;

performing the first operation based on a result of comparing the second value to the third value.

21. The method of claim 20, further comprising:

decoding a second instruction read from the instruction memory;

determining that the second instruction is a second reconfigurable instruction;

determining that the first operation is also enabled for the second instruction; and determining not to perform the first operation based a result of comparing a second value from a second field from the set of fields to the third value.

22. The method of claim 20, further comprising:

decoding the instruction a second time;

reading the third value a second time; and determining not to perform the first operation upon determining that a result of comparing the first value to the third value a second time.

23. The method of claim 22, further comprising:

determining that a fourth value in a third field from the set of fields enables a second operation from the plurality of operations, wherein the second operation is performed upon a first decoding of the instruction and again when the instruction is decoded the second time.

24. The method of claim 22, further comprising:

determining, upon decoding the instruction the second time, that the instruction enables no operations.

\* \* \* \* \*